United States Patent [19]

Shatto

[11] 4,106,335

[45] Aug. 15, 1978

[54] SEA SLED TOW LINE VECTOR SYSTEM

[75] Inventor: Harry H. Shatto, Laguna Beach, Calif.

[73] Assignee: Santa Fe International Corporation, Orange, Calif.

[21] Appl. No.: 753,983

[22] Filed: Dec. 27, 1976

[51] Int. Cl.² ............................................. G01L 5/10
[52] U.S. Cl. .................................. 73/143; 73/170 A
[58] Field of Search ................. 73/143, 170 A, 184, 73/141 A, 133 R, 452 R; 114/242, 244, 245, 247, 253; 61/724; 340/29; 33/300, 301, 303, 333, 354; 318/646, 648

[56] References Cited

U.S. PATENT DOCUMENTS

| | | | |
|---|---|---|---|
| 2,142,135 | 1/1939 | Lawton | 61/72 A |
| 2,513,295 | 7/1950 | Eisenberg | 73/141 A |
| 3,125,980 | 3/1964 | Anderson | 114/235 |
| 3,695,103 | 10/1972 | Olson | 73/189 |
| 3,722,268 | 3/1973 | Crooke et al. | 73/143 |
| 3,967,573 | 7/1976 | Charles et al. | 115/6 |

OTHER PUBLICATIONS

Bulletin R-8; W. C. Dillon & Co., Inc.; Nov. 1962, pp. 13–16.

*Primary Examiner*—Charles A. Ruehl
*Attorney, Agent, or Firm*—LeBlanc & Shur

[57] ABSTRACT

The tow line system permits a determination of the direction and magnitude of tow line forces on the underwater tow. The response of the underwater tow to the tow line forces is also monitored. The system is adaptable to any system capable of measuring forces and angles remotely and transmitting these values to the surface by means of electrical, hydraulic, or pneumatic signals. The underwater tow can be any object which responds to the force of gravity and which is directed by one or more tow lines. The system consists of symmetrically placed horizontal and vertical load cells, two each in number, at the base of an isosceles triangle formed by a chain or cable tow bridge, the vertex of which is connected by means of another cable or chain or combination thereof to the tow vessel which also houses the display console. The underwater tow further contains a gravity oriented pitch angle detector whose plane is parallel to the bisector of the vertex of the tow bridle and whose zero index identifies the normal posture of the underwater tow when resting on a horizontal reference surface. The vertical load cells are perpendicular to the horizontal reference surface and parallel to the direction of zero index of the pitch indicators. The response of the underwater tow is compared to a level plane and any deviation of the underwater tow or the forces upon it is immediately detected.

66 Claims, 10 Drawing Figures

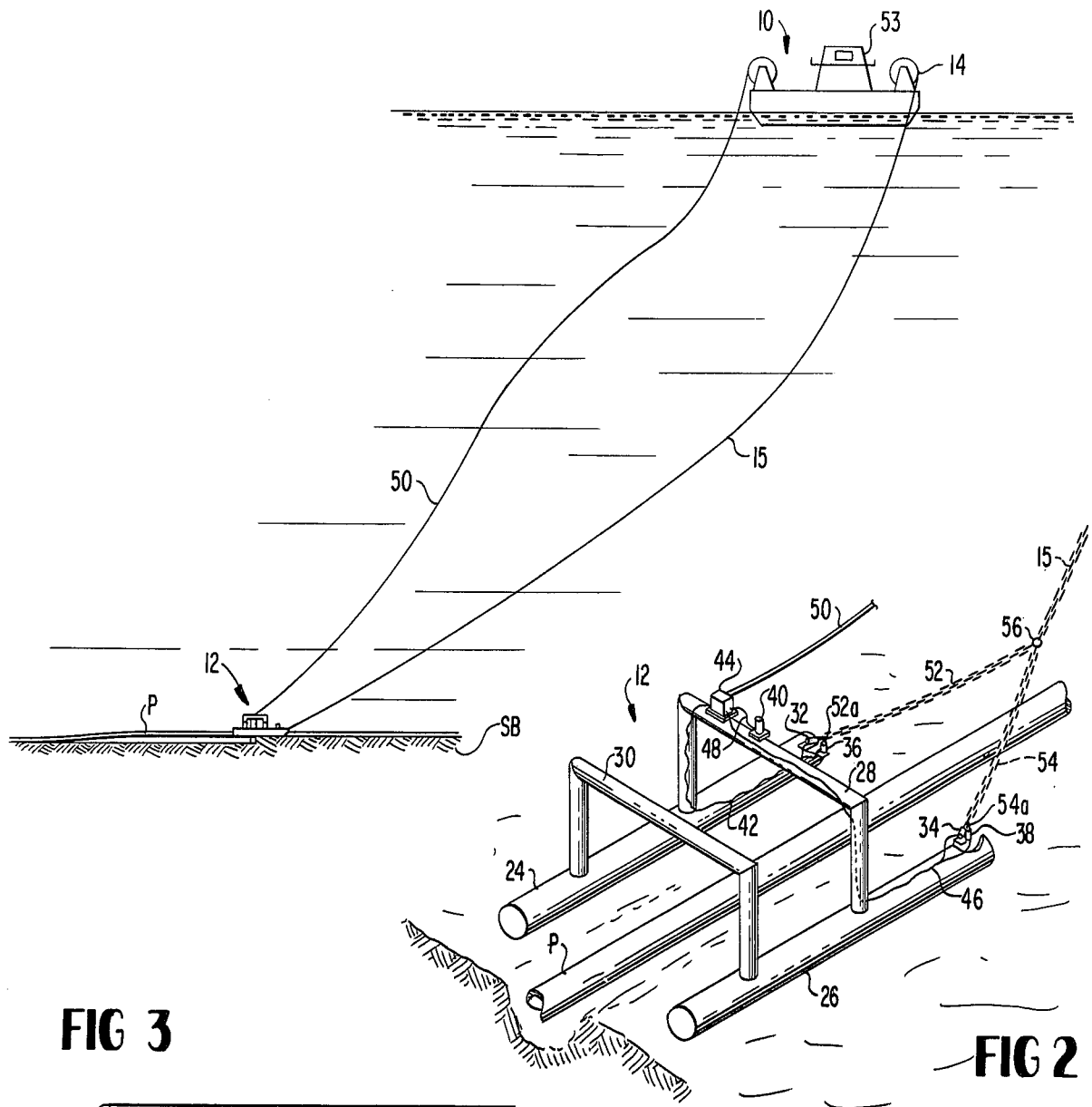
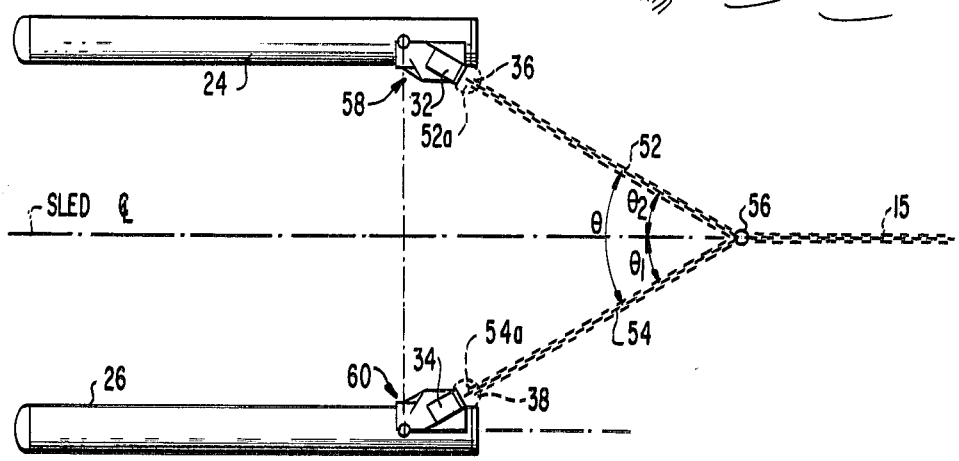

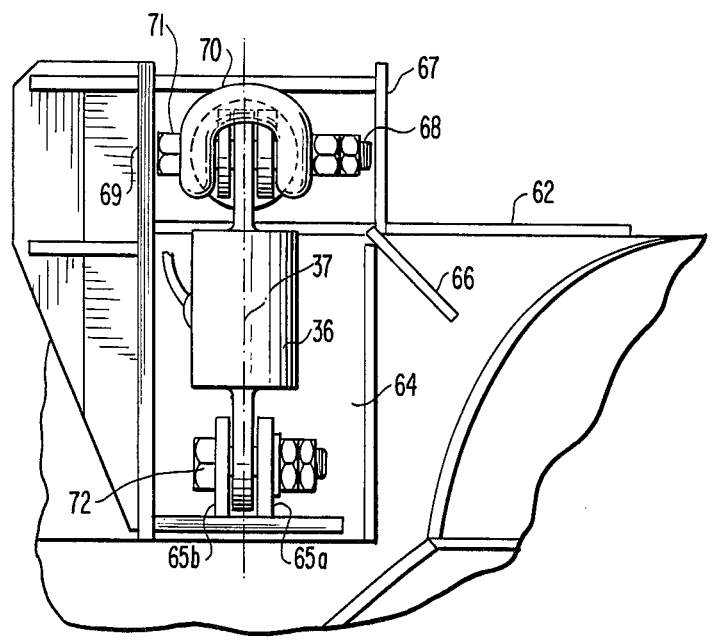
FIG 8
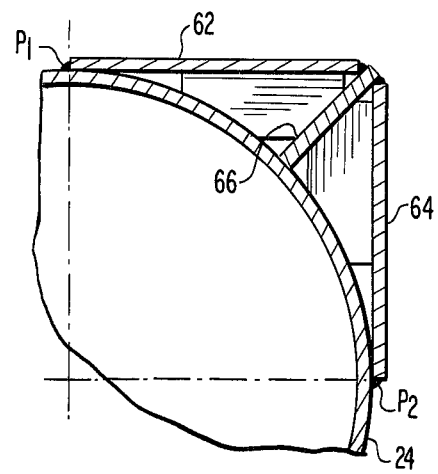
FIG 7
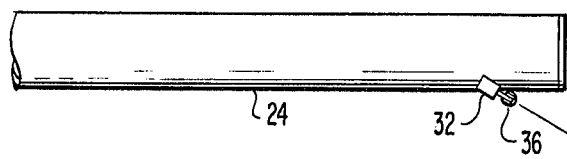
FIG 4
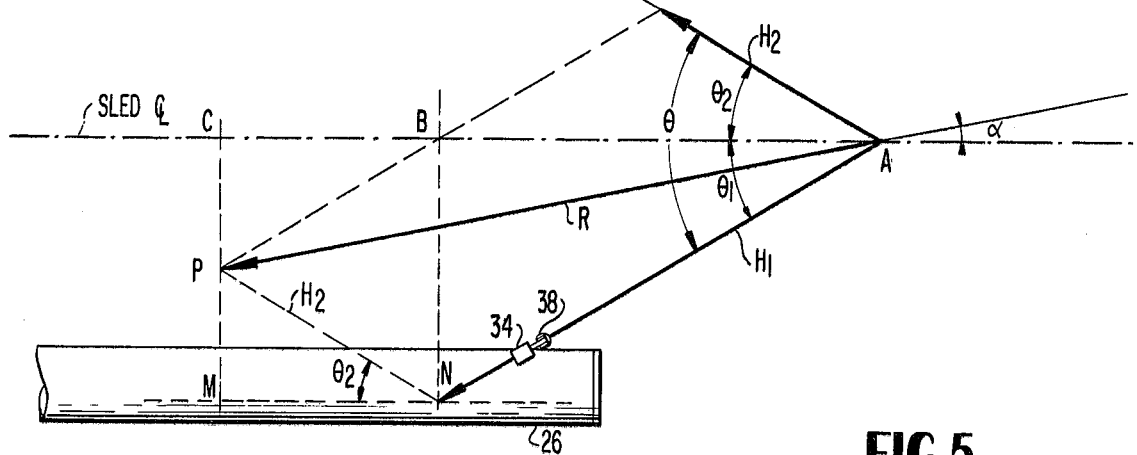
FIG 5
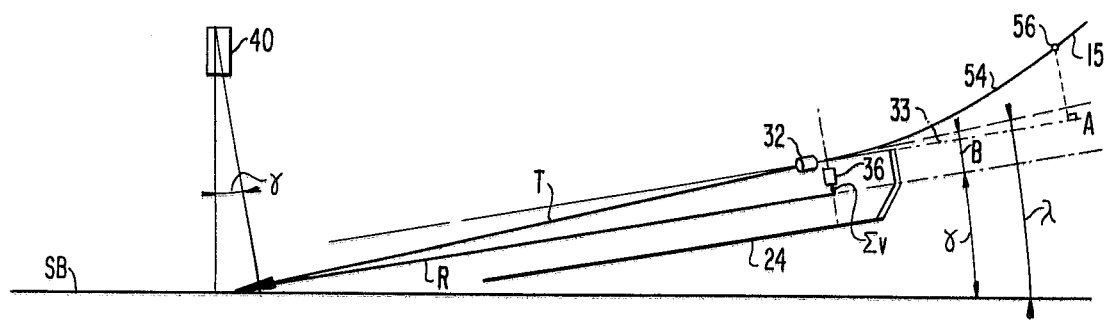

SEA SLED TOW LINE VECTOR SYSTEM

FIELD OF THE INVENTION

This invention generally relates to towing underwater structures. In particular this invention relates to an underwater pipe burying sled.

More particularly, the present invention relates to a sea sled for entrenching and burying undersea pipeline and to a system for measuring the forces acting on the tow line connecting the underwater tow to the towing vessel.

The present invention is intended for use with, but not limited to, a sea sled such as described in assignee's U.S. Pat. No. 3,877,238 issued Apr. 15, 1975 to Chang et al for *SEA SLED FOR ENTRENCHING AND PIPE BURYING OPERATIONS*.

For convenience, the present invention will be described hereafter with reference to its use in conjunction with a sea sled of the type described, for example, in the '238 patent; it will be understood however, that the term "sea sled" is meant to be considered generically to include any towed structure operating in a subsurface fluid environment.

BACKGROUND OF THE INVENTION

Sea sleds of the type with which the present invention is most nearly associated are primarily used for entrenching submerged elongated structures, such as pipelines and the like.

Various systems for laying pipelines along the sea bottom have been proposed and utilized in the past (see, for example, U.S. Pat. No. 3,751,927). Certain of these systems provide a sea sled having jet nozzles directed to fluidize the sea bottom and form a trench for receiving the pipeline. Air jet type eductor systems are provided for removing the cuttings or slurry formed by the jet nozzles from the trench. An improved system which operates efficiently at water depths in excess of 150–200 feet is described in said U.S. Pat. No. 3,877,238 and the disclosure thereof is incorporated herein by reference.

In underwater towing, normally the only force measured is the force acting on the tow line connecting the underwater tow to the surface towing vessel. Frequently, the tow or sea sled, will have an attitude other than horizontal or in alignment with the pipeline; that is, the sled may be tilted about one or more of its longitudinal, lateral and vertical axes. This slewing of the sled may be caused by unevenness in the ocean bottom or obstructions in the path of the sled or due to action of the tow line on the sled. Thus, the sled may be towed in a direction other than the desired one. Additionally, the sled may be subjected to horizontal jerking of the tow line which results in lifting the sled off the ocean bottom. Further, the tow line may have insufficient weight to match the length of tow line available.

Prior to the development of this invention, there was no accurate means available for remotely indicating the position of the sea sled relative to the ocean bottom or for measuring the forces actually imposed on the sled by the tow line and movement of the towing vessel located on the surface (hereafter for convenience, but not by way of limitation, referred to as the "tow barge" or merely "barge"). The operator therefore had no precise way of knowing whether the sled was being pulled too far to the right or left or whether it had hit an obstruction. Heretofore, the operator could rely only on highly inaccurate systems, such as a three-pulley in-line arrangement that measured the deflection of and tension on the towing cable at the barge. One such system is the so-called "Dynaline" manufactured by Martin Decker. A major disadvantage of this type of system is that it provides an indication only of the forces acting on the tow line at the barge on the surface and gives no indication of the attitude of or forces acting directly on the sled at the sea bottom.

Another means that has been used in the past to monitor the position of the sea sled consists of load cells mounted on the sled in such a way as to indicate contact of the pipeline with rollers mounted on the sled and straddling the pipeline. Examples of such load cells and remote indicators associated therewith are shown, for example, in U.S. Pat. No. 3,507,126. Devices of this type provide a measure of the lateral off-course movement of the sled to permit the barge operator to adjust the sled position by moving the tow barge in the opposite lateral direction to avoid damaging the pipeline. Such indicating means, however, do not allow for an accurate determination of the attitude of the sled relative to the ocean bottom (and thus the pipeline resting on the bottom) nor of the forces acting on the tow line at the sled.

Other barge mounted measuring devices have been employed in the past with no greater success than the systems mentioned above. Because of the incomplete information and inaccuracies inherent in such prior art systems, the barge operator encountered substantial difficulties in accurately controlling the sled relative to the pipeline as it moved over the ocean floor. As a consequence, the operator could not efficiently maintain the sled in proper operational relationship with the pipeline. Also, he could not readily adjust the sled attitude with any degree of certainty to overcome obstacles encountered by the sled. Nor could he conveniently and accurately reposition the sled relative to the pipeline. Further, overcompensation for incorrect towing sometimes resulted in over-turning the sled, which could damage it or rupture water or air supply lines connected to the sled. Costly down time delays would then be encountered.

The present invention was developed to provide a system for accurately monitoring the forces acting on the tow line in such a way as to provide a precise indication of the position of the sled with respect to the ocean bottom. As will be described more fully hereinafter, the invention utilizes the vector relationships among forces imparted to the tow line by the sled. These forces are measured at the sled and are displayed on a console located at the operator's station on the barge.

The system of this invention permits an operator located on the towing vessel to accurately continuously monitor the attitude and position of the sea sled as well as the various forces acting on the tow line. The operator can then make necessary corrections to the tow to compensate for attitude and/or direction changes of the sea sled in towing and to properly reposition the sled in relation to the pipeline. This is accomplished by changing the location of the tow barge in the usual manner, e.g., by shifting the barge to the right or left or moving it forward or backward, as necessary.

In order to fully appreciate the significance of this invention, it will be helpful to understand the basic mechanics of towing a subsurface structure. The motion of the sea sled on the ocean floor is determined primarily by the pull of the tow line exerted from the towing barge.

Due to ocean currents, the sled will normally not be directly behind the tow barge, but will be laterally offset to an extent depending on the strength and direction of the prevailing ocean currents. The sled movement is effected and controlled by movement of the barge, but movement of the sled may not directly correspond to movement of the barge. Thus, one concern of the operator is the actual effect on the sled of the pulling force exerted by the tow barge. Stated another way, using the present invention, the operator is concerned with the net vectors of forces acting on the sled which will tell the operator in what direction and under what force the sled is being pulled. Knowing these, the barge operator can move the barge on the surface to obtain an optimum tow of the sled on the sea bottom.

It is also helpful for the operator to be able, in effect, to "see" the sled to avoid towing it into a potentially detrimental situation. If we assume a sled weight of 50 tons (sled weights typically range from 40 to 80 tons or more), if a vertical force of 25 tons were applied to one side of the sled, that side would lift off the ocean bottom. If the operator were to continue to move the barge in such a manner that a vertical force of slightly more than 25 tons were continued to be applied to the lifted side of the sled, an overturn condition would occur. The present invention provides a system for indicating the vertical and other forces on each side of the sled and the sled angle with respect to the horizontal reference surface so that the operator can move the barge in such a way as to reduce any excessive force acting on one side of the sled as required to avoid the potential overturn condition. The actual adjustments are made by the operator controlling sets of winches connected to anchor chains on the barge. By pulling in or paying out line to the barge anchors, the operator can move the barge on the surface which in turn will, through the sled tow cable, cause the sled to move appropriately. This type of barge movement system is well known and forms no part of this invention per se.

This invention is particularly useful where two systems are connected to the same sled, each system having different strengths. Such would be the case where water or air supply hoses are spooled off the stern of the tow vessel and the sled tow line is spooled off the bow. Since the bow and stern of the tow vessel move in different modes, it is mandatory that each line be given its optimum configuration but that the hose lines be given preference. This is because the hose lines are most sensitive to overload situations, they are more difficult to replace and they are considerably more expensive than the tow lines. It is therefore desirable that the hose tensile force be kept below its maximum permitted value. Failure to do so risks hose rupture due to differential movement between the sled and the stern of the towing vessel.

It is an object of this invention to provide a system for continuously monitoring the attitude and directon of movement of an underwater tow.

More particularly, the system of this invention has for its objects the following:

To determine whether the length of tow line for the weight of chain used is too short or too long.

To determine whether the tow line is pulling the sled straight ahead or to the right or to the left.

To determine the magnitude of corrective action necessary to force the sled to move right or left.

To determine whether the sled has encountered an obstruction which tends to force the sled off its intended course horizontally or vertically.

To determine the effect of the tow line system on the sled to give an evaluation of the sled's ability to perform its function as the tow vessel responds to the ocean environment.

To indicate whether the sled is falling into a trench behind trenching mechanisms when used in conjunction with such mechanism: i.e., the sled pitches up at the forward end.

To indicate whether the sled encounters softer material: i.e., the sled pitches down at the forward end.

To determine the optimum required weight of tow chain.

To determine the condition for overturn of the sled.

To provide the optimum safety to the weakest of two systems when two tow systems are connected to the same underwater tow.

SUMMARY OF THE INVENTION

In accordance with the present invention, a pair of horizontal and vertical load cells are mounted at or toward the front end of each lateral side of the underwater tow, such as a sea sled, at the base of an isosceles triangle formed by the tow line bridle. The bridle consists of two lengths of tow line forming the legs of the isosceles triangle, with each leg being connected to a respective pair of the horizontal and vertical load cells. The two lengths of bridle tow line are connected at the apex of the isosceles triangle, to which is also connected the main tow line, extending to a surface towing vessel. Also mounted on the sled is a gravity oriented pitch angle detector whose plane is parallel to the bisector of the vertex of the tow bridle and whose zero index identifies the normal posture of the underwater tow when resting on a level and hard horizontal surface (i.e., a horizontal reference surface). The vertical load cells are mounted perpendicular to this horizontal reference surface and parallel to the direction of the zero index of the pitch indicator. The horizontal load cells are mounted in a plane parallel to the horizontal reference surface. The load cells and pitch indicator are connected by an umbilical which transmits electrical, hydraulic or pneumatic signals representing the load cell and pitch indicator measurements to the surface vessel. Located on the surface vessel are suitable means for measuring the total vertical components of force imparted to the tow line by the underwater tow, the amount of tension on the tow line, the net vertical upward tension or downward compression at the connection of the tow line and the underwater tow, the vertical angle of the tow line relative to the plane of the horizontal axis of the underwater tow, the horizontal angle of the tow line relative to the center line of the underwater tow, the horizontal components of force imparted to the tow line by the left and right sides of the underwater tow, respectively, and the angle of the tow line relative to the surface of the ocean bottom. These determined parameters are displayed on a console. From the displayed values, the operator can move the surface vessel and/or make appropriate adjustments to the tow line to maintain preferred tow operating conditions.

Instruments are commercially available to measure the vertical tension or compression, the horizontal tension or compression, the pitch angle, and to provide the electronic, pneumatic, or hydraulic functions indicated and required. The use of logic matrixes gives continuous readout to the required display, thereby permitting not only magnitudes but also visual changes in magnitudes to be displayed.

BRIEF DESCRIPTION OF THE DRAWINGS

FIG. 1 is a schematic illustration of a tender barge for handling the sea sled used with the present invention and illustrating the sled in use on the sea bottom;

FIG. 2 is a stylized illustration of the sled showing the mounting of the force and position detectors;

FIG. 3 is a plan view of the sea sled pontoon and load cell mounting assemblies;

FIG. 4 is a plan view of the tow line geometry;

FIG. 5 is a side elevational view of the tow line geometry;

FIG. 7 is a section taken along line VII—VII in FIG. 6 showing the load cell mounting plates;

FIG. 8 is a view taken along line VIII—VIII in FIG. 6 showing the vertical load cell mounting;

DESCRIPTION OF THE PREFERRED EMBODIMENT

Figure 6:
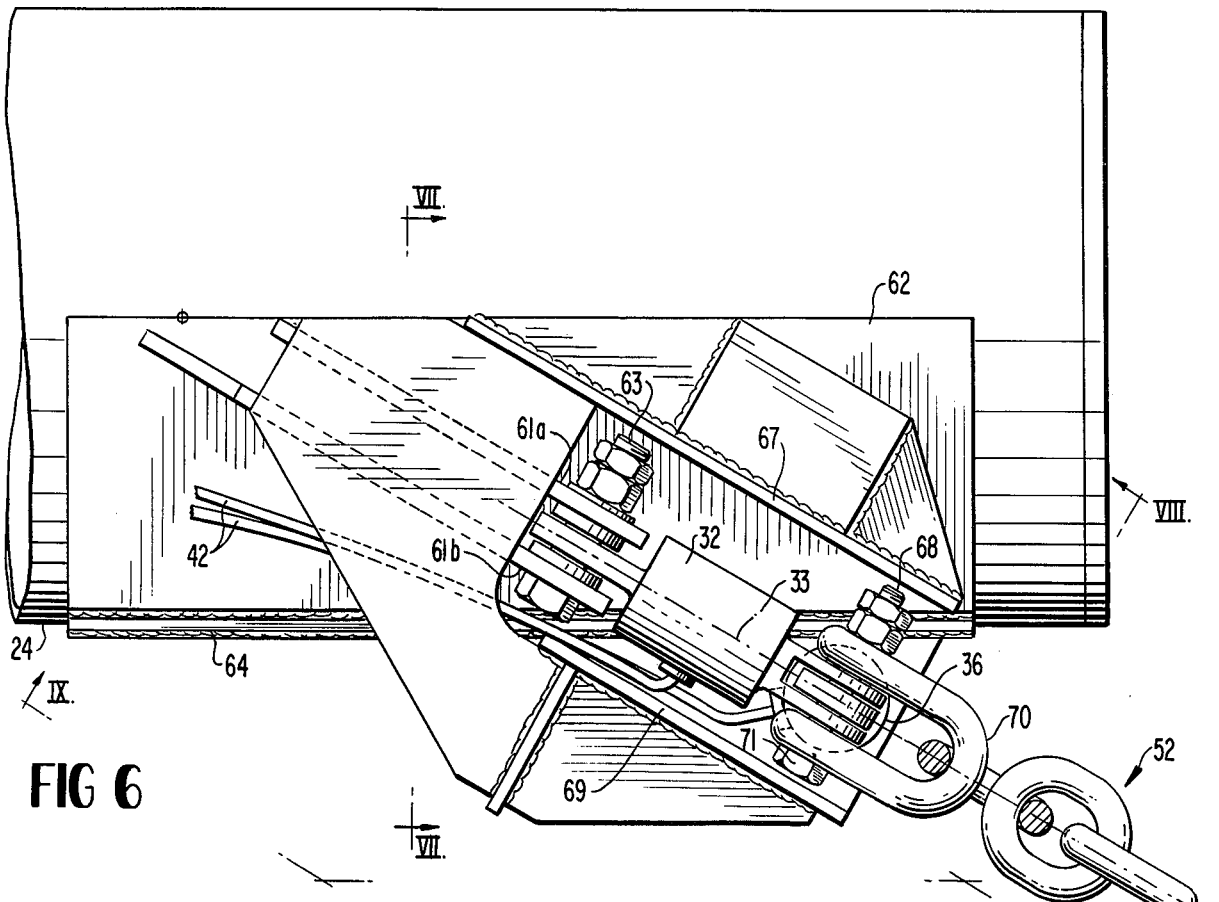
FIG. 6 is a detailed plan view of a load cell mounting assembly.

Referring now to FIG. 1, there is illustrated a towing barge, generally designated 10, for towing a sea sled, generally designated 12. The barge 10 carries on it at least a winch and reel assembly 14 for reeling in or paying out a tow cable 15 connected to the sled 12. The barge also carries a further winch and reel assembly for similarly controlling the length of air and water supply hoses and other umbilicals, generally shown as a single umbilical 50, connected between the barge 10 and sled 12. Further details of the tender barge 10 are not believed necessary since the tender barge 10, per se, forms no part of the present invention. It is believed sufficient to note that the tender barge 10 serves to transport the sea sled to and from the work site, to tow the sea sled 12 along the sea bottom designated SB in FIG. 1 during entrenching and pipeline burying operations, and to provide a surface floating carrier for personnel and equipment necessary to the operation of the sea sled and the monitoring and control system of this invention as described hereinafter.

A sea sled of the type to which this invention may be particularly adapted is disclosed in assignee's U.S. Pat. No. 3,877,238; reference is made to the disclosure thereof for the details of construction of the sled. In commercial practice to date, assignee Santa Fe International Corporation has used a conventional rectangular hull barge which carries winches for anchor chains and water hoses, pumps, etc.; that barge is known in the trade as the "Creek".

FIG. 2 is a stylized representation of the sea sled 12 showing how the horizontal and vertical load cells, the pitch detector, and the signal transmission cables are mounted. More particularly, sled 12 contains laterally spaced pontoons 24, 26 connected by transverse members 28, 30. This construction, the details of which are shown in the 3,877,238 patent, provides a relatively rigid structure having a clear area between the pontoons 24, 26, whereby the pontoons are adapted to straddle a pipeline P disposed on the sea bottom.

Mounted toward the front end of pontoon 24, at a first location, is a horizontal load cell 32 and a vertical load cell 36, comprising a first load cell pair. A second load cell pair, consisting of horizontal load cell 34 and vertical load cell 38, is mounted on the pontoon 26 adjacent the front end portion thereof, at a second location. The first load cell pair is connected by a cable 42 to a junction box 44 mounted, for convenience, on transverse strut 28. In a similar manner, the second load cell pair is connected through a cable 46 to the junction box 44.

A gravity oriented pitch angle detector 40 is also mounted on the sled 12; for convenience, pitch detector 40 may be mounted on transverse strut 28, as shown in FIG. 2. The particular location of the detector 40 on the sled 12 is not critical; it is only necessary that the detector 40 be fixed to the sled 12 such that the plane of pitch detection is parallel to the bisector of the vertex of the tow line bridle and the zero index of the detector identifies the normal posture of the sled when resting on a "level and hard surface" (i.e., a horizontal reference plane). Thus, the zero index of the pitch angle detector 40 should be perpendicular to a nominal horizontal reference plane or surface representing a flat and hard ocean bottom. The pitch angle detector 40 is connected through cable 48 to the junction box 44.

An umbilical 50 connects the junction box 44 to a display console 53 (FIG. 1) and associated circuits located on the towing vessel (e.g., the barge 10). The purpose of the junction box is to bring together at one common point all of the separate cables from the various force and position detectors mounted on the sea sled, from which they can be carried through a common multicable umbilical to the display console.

The tow line bridle connecting the sea sled to the main tow line 15 consists of a first leg 52 connected at one end 52a to the first load cell pair. A second leg 54 of the bridle is connected at one end 54a to the second load cell pair. The other ends of legs 52 and 54 are connected to each other at a junction point 56. The main tow line cable 15 is connected to the junction 56 and extends therefrom to the surface towing vessel 10.

FIG. 3 is a plan view showing pontoons 24 and 26. Located on the inboard side on pontoon 24 adjacent its forward end portion is a load cell mounting assembly 58. A corresponding load cell mounting assembly 60 is located on the inboard side of pontoon 26 adjacent the forward end thereof. Bridle legs 52 and 54 represent two legs of an isosceles triangle. Horizontal load cells 32 and 34 are mounted such that their longitudinal axes are parallel to and coincident with horizontal projections of legs 52 and 54, respectively. Unless otherwise indicated, all planar relationships will be considered as referenced to the sled resting on a "hard and level surface", i.e., a horizontal reference plane.

The apex of the isosceles triangle formed by the bridle legs 52, 54 is coincident with junction point 56. This apex in turn lies in a vertical plane containing the center line CL of sled 12. The apex angle $\theta$ can be any angle. However, to accommodate the electronic circuits preferably used in this system, which are based on calculations of the sines and cosines of angular relationships, $\theta$ has, for convenience, been chosen to be 60°; $\theta_1$ and $\theta_2$ are each 30°. This is to take advantage of the following known relationships.

$\sin 30° = \frac{1}{2}$; and $\cos 30° = (\sqrt{3}/2)$.

FIG. 4 is a plan view showing the horizontal tow line geometry, and particularly the forces acting on the tow line when the tow chain 15 is at an angle $\alpha$ to the left of the sled center line CL. Point A represents the apex of the isosceles triangle formed by the tow line bridle, coincident with the junction 56 between the bridle and main tow chain 15. Vector $H_1$ represents the horizontal force component detected by load cell 34; vector $H_2$ represents the horizontal force component detected by load cell 32. Line AN represents the magnitude of vector $H_1$ having a direction indicated by the arrowhead at point N. Line NP is force vector $H_2$ vectorily added to vector $H_1$. Vector R (line AP) is the resultant of the vector addition of $H_1 + H_2$. Vector R represents the vector sum of the forces imparted by the sled to the tow line in a plane containing the sled centerline and nominally parallel to the horizontal reference plane. For convenience, R may be referred to as the net horizontal force component. Angle $\alpha$ represents the relatively horizontal angle by which the tow line is displaced from the sled center and is thus an indication of the relative horizontal forces on the sled, i.e., whether it is being pulled to the left or right.

The magnitude of R can be determined, employing standard analytic geometry techniques, in the following way:

$\overline{AB}$ represents the projection of $H_1$ on the sled center line.
$\overline{AB} = H_1 \cos \theta_1 = H_1 \cos 30° = (\sqrt{3}/2) H_1$.
$\overline{BC}$ is the projecton of $H_2$ on the sled center line.
$\overline{BC} = H_2 \cos \theta_2 = H_2 \cos 30° = (\sqrt{3}/2) H_2$.
Therefore, $\overline{AB} + \overline{BC} = \overline{AC} = \sqrt{3}/2)(H_1 + H_2)$.

Line MN represents a line parallel to the sled center line and intersecting end point N of force vector $H_1$.

Line NB is perpendicular to lines MN and the sled center line and MC is parallel to NB and intersects the end point of vector R at point P.

$\overline{NB}$, and therefore $\overline{MC}$, represents the projection of $H_1$ perpendicular to the sled center line.
$\overline{MP}$ represents the projection of $H_2$ perpendicular to the sled center line.

$\overline{MC} = H_1 \sin \theta_1 = H_1 \sin 30° = \frac{1}{2} H_1$.

$\overline{MP} = H_2 \sin \theta_2 = H_2 \sin 30° = \frac{1}{2} H_2$.

$\overline{PC} = \overline{MC} - \overline{MP} = \frac{1}{2}(H_1 - H_2)$.

$$R = \sqrt{\overline{AC^2} + \overline{PC^2}} = \sqrt{\left[\frac{\sqrt{3}}{2}(H_1 + H_2)\right]^2 \left[\frac{1}{2}(H_1 + H_2)\right]^2}$$

It will be seen that ACP represents a right triangle of sides AC and PC and hypotenuse R. Therefore, tow angle $\alpha = \tan^{-1} AC/PC$;

$$\alpha = \tan^{-1}\left[\frac{(H_1 - H_2)}{\sqrt{3}(H_1 + H_2)}\right]$$

From the above, it will be clearly seen that the magnitude of the net horizontal force component R acting on the tow line and the horizontal angle $\alpha$ which the tow line makes relative to the center line of the sled can be readily determined from the measurements of the horizontal forces on the tow bridle made by load cells 32 and 34.

The calculation of vector R and angle $\alpha$ makes possible a determination of the optimum required weight for the tow chain and, in conjunction with the vertical forces, when an overturn condition is imminent. In addition, the calculation of R is used to determine the sled cable angle, as described below.

The sled cable angle $\beta$ and net cable vector angle $\lambda$ are determined according to the geometry shown in FIG. 5. The net horizontal force component R is coplanar with the horizontal reference plane. The vertical declination of R with respect to the sled center line is a function of the total vertical forces imparted by the sled to the tow line and is tangent to the tow line at its connection with load cell assemblies 58 and 60. Load cell 36 measures a vertical force represented by vector $V_1$; load cell 38 (not shown) measures a corresponding vertical force $V_2$. The sum $\Sigma V$ of vertical forces $V_1 + V_2$ represents the total vertical force imparted by the sled to the tow line relative to the horizontal reference plane.

As shown in FIG. 5, $\Sigma V$ represents the vector sum of the vertical force vectors $V_1$ and $V_2$; the vector sum of $R + \Sigma V$ is a vector T which is tangent to the tow line catenary at the connection of the tow line bridle with load cell assemblies 58 and 60. Vector T represents the vertical declination which R makes with respect to the sled center line. The vertical angle $\beta$ which T makes with the sled center line represents the sled cable angle. Based on this geometry it can be seen that angle $\beta$, representing the vertical angle which the tow line cable makes with the center line of the sled can be defined as:

$$\beta = \tan^{-1}\left[\frac{\Sigma V}{R}\right]$$

It will sometimes happen that the sled 12 will not be level. If the tow line is too short or the sled is falling into the trench dug behind it the bow of the sled will pitch up; if the sled begins to sink into soft material lying ahead of it, the bow will pitch down. In either case, the measured cable angle must be compensated to account for the pitch of the sled. Otherwise, the cable angle reading at the operator's display console will be incorrect and will provide an improper indication of the sled attitude.

In order to determine the angle which the tow line cable makes with the ocean bottom, it is necessary to measure the pitch angle of the sled, that is, the angle which the sled center line makes with the ocean bottom represented by the horizontal reference plane (or "hard and level surface"). This angle $\gamma$ is measured by the pitch angle detector 40 and is added to sled cable angle $\beta$ to obtain the net cable vector ($\lambda = \beta + \gamma$).

Next will be described a particular mounting arrangement for the load cell assemblies on the sled.

Mounting assemblies 58 and 60 are essentially mirror images of each other. Thus, for the sake of brevity, the following detailed description of the load cell mounting assembly will be referenced to assembly 58, with the understanding that mounting assembly 60 is substantially identical to assembly 58 in a mirror image fashion.

Referring to FIG. 7, a first plate 62 is mounted on pontoon 24 so as to lie in a horizontal reference plane when the sea sled is resting on a "hard and level surface." Plate 62 is mounted so as to be tangent to pontoon 24 at point $P_1$. A second plate 64 is mounted so as to be tangent to pontoon 24 at Point $P_2$. The plane of the surface of plate 64 is perpendicular to the surface plane of plate 62. Plates 62 and 64 are respectively parallel to horizontal and vertical planes bisecting pontoon 24. A bracing member 66 extends from the surface of pontoon 24 and is welded or otherwise secured to the ends of horizontal and vertical plates 62 and 64, respectively.

As shown in FIG. 6, one end of the first horizontal load cell 32 is secured by means of a bolt 63 to spaced mounting brackets 61a, 61b fixed to plate 62. The other end of load cell 32 is secured to a shackle bolt 68; the end of load cell 32 which mounts on shackle bolt 68 is bifurcated with aligned apertures for receiving the shackle bolt. The mounting of load cell 32 is such that longitudinal axis 33 of load cell 32 forms an angle $\theta_2$ with the center line of the sled 12 in the horizontal reference plane, and therefore with the center line of pontoon 24, assuming a generally parallel relationship among the sled and pontoon center lines.

The mounting of load cell 36 is shown in FIG. 8. One end of vertical load cell 36 is mounted on shackle bolt 68 between the bifurcated ends of load cell 32. The other end of vertical load cell 36 mounts on a bolt 72 secured to the vertical plate 64 through mounting brackets 65a, 65b fixed to plate 64. The mounting of load cell 36 is such that the longitudinal axis 37 thereof is substantially parallel to the surface plane of plate 64 and is perpendicular to the longitudinal axis of load cell 32 and to the horizontal reference plane.

A towing shackle 70 mounted on shackle bolt 68 connects the one end 52a of the tow line bridle leg 52 to the sea sled.

Figure 9:
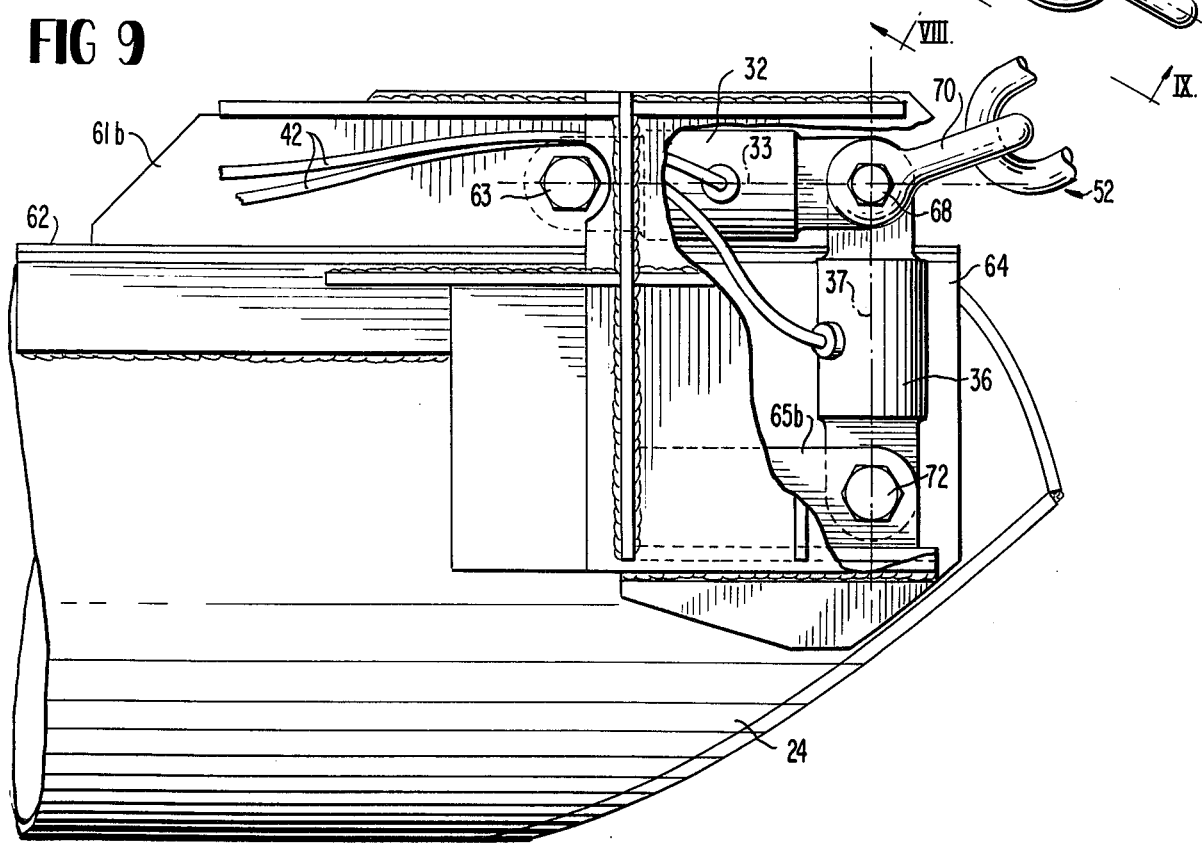
FIG. 9 is a view taken along line IX—IX in FIG. 6 showing the mounting of the vertical and horizontal load cells.

As shown in FIG. 9, load cells 32 and 36 are connected to the sled and tow chain bridle in such a way as to measure in a known manner, the horizontal and vertical components, respectively, of the pulling forces acting between the sled and the tow line through shackle bolt 68. The tow chain 15, acting through bridle leg 52 and shackle 70 tends to exert a pulling force on shackle bolt 68. Preferably, there should be a limited amount of clearance between the end of bolt 68 and its head 71 with respect to side plates 67 and 69, e.g., 0.125 inch, to avoid lateral displacement in excess of that allowed by bolt 63, due to skew and normal tolerances. The horizontal and vertical components of this force are measured by load cells 32 and 36, respectively. The load cells are capable of withstanding and measuring forces in excess of 10 tons and yet are sensitive enough to detect small forces, such as a person pulling on the cell.

It will be seen that the particular mounting arrangement shown in FIGS. 6-9 is exemplary only and the principal requirement for the mounting of the load cells is that the axial and angular relationships set forth in this disclosure be maintained.

Figure 10:
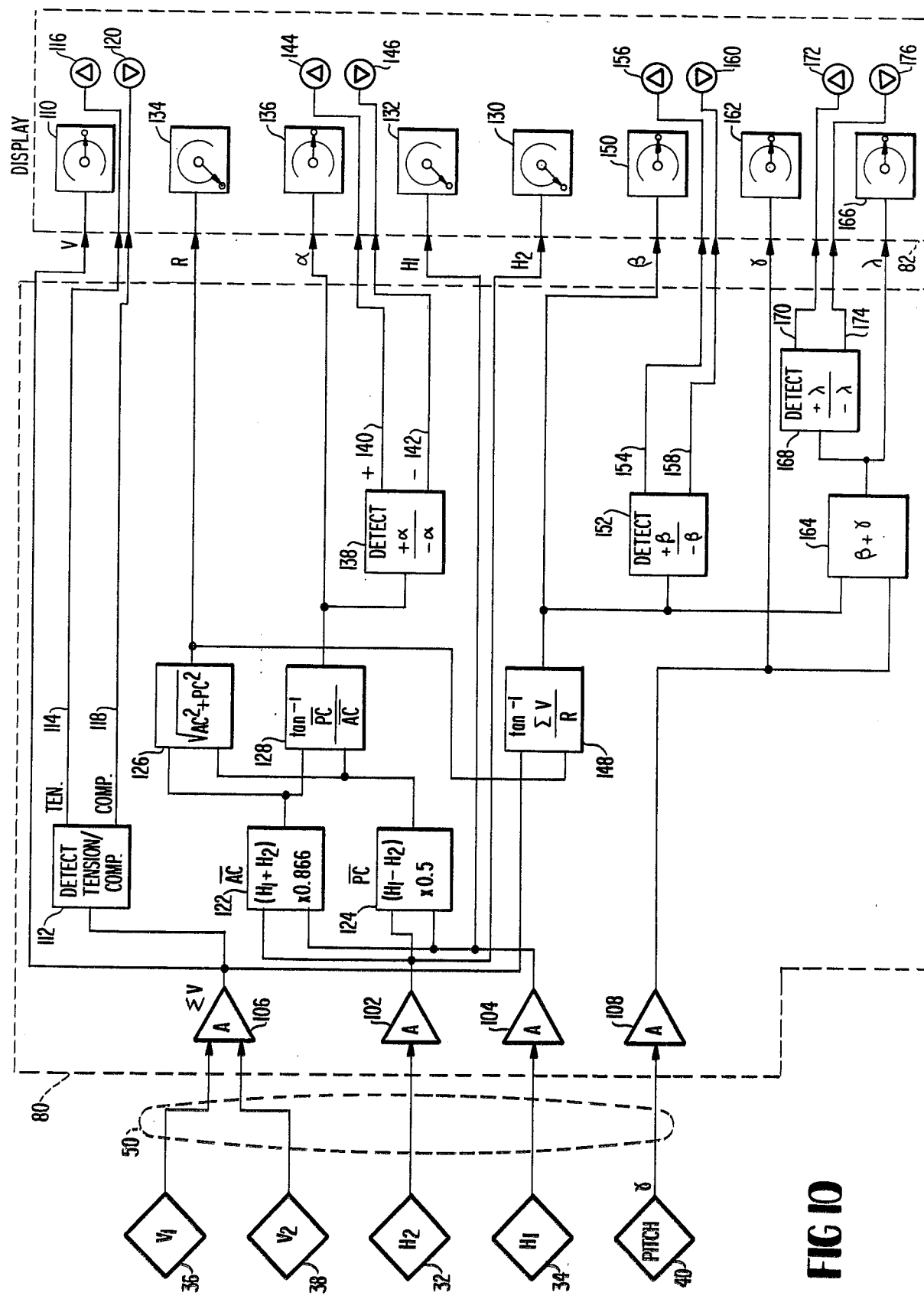
FIG. 10 is a block diagram of the sled position monitoring circuit.

FIG. 10 shows an electrical circuit for operating on the signals produced by the horizontal and vertical load cells and the pitch angle detector. Block 80, which contains the devices for operating on the signals generated at the sled, and block 82, which contains the display indicators, are located at the operator's console 53 on the barge. Horizontal load cells 32 and 34 generate electrical signals proportional to the horizontal components of the pulling forces acting on the shackle bolt 68. Similarly, load cells 36 and 38 generate electrical signals proportional to the vertical components of the pulling forces acting on the shackle bolt 68. Pitch angle detector 40 generates an electrical signal porportional to the vertical angle which the sled and the horizontal reference plane make with the zero pitch axis of detector 40. Devices 32, 34, 36, 38 and 40 may each comprise one leg of an AC or DC bridge circuit in which, as is well known, an output voltage is generated as a function of the unbalance condition produced by a change in the variable impedance member (i.e., devices 32, 34, 36, 38 or 40).

The output signal generated by load cell circuit 32 is amplified in amplifying circuit 102. The output signal generated by load cell circuit 34 is amplified in amplifier 104. The output signals generated by load cell circuits 36 and 38 are combined in summing amplifier 106. The output signal generated by pitch angle detector circuit 40 is amplified in amplifier 108.

If AC bridge circuits are used, appropriate filter circuits (not shown) may be connected to the output sides of the amplifiers 102, 104, 106 and 108 in a known manner to filter out the AC carrier, leaving only a DC signal proportional to the parameter being measured.

Summing amplifier 106 produces an output signal representing $\Sigma V = V_1 + V_2$ which is displayed on the operator's console by means of an appropriately calibrated meter 110. The output of amplifier 106 is also coupled to a tension/compression detector 112. Detector 112 consists of a comparator circuit for comparing the input voltage with a reference voltage and generating an output signal indicative of whether the input voltage is above or below the reference voltage. In the case of this invention, the reference voltage may represent a zero net vertical force on the tow cable. A positive input voltage relative to the reference voltage indicates that the cable is pulling the sled upward; an output signal will be generated on line 114, and displayed at the operator's console by an appropriate indicator light 116, which may be a green arrow pointing upward. If the cable, which is weighted, or contains too much slack, so that, for example, it drags on the ocean bottom, it will in effect exert a downward pulling force on the front of the sled. This condition will be detected as a compressive force on the vertical load cells and thus by an input voltage to comparator 112 which is less than the zero net vertical force reference voltage, an output signal will then appear on "compression" line 118 and will be displayed on the operator's console as an illuminated light 120, which may be in the form of a red arrow pointing downward.

It will be readily apparent to anyone skilled in the relevant art that the outputs of vertical load cells 36 and 38 could be individually amplified and the individual vertical force measurements $V_1$ and $V_2$ displayed on appropriately calibrated meters located on the operator's console. This would provide an indication to the barge operator of the vertical force at each pontoon.

The outputs of amplifiers 102 and 104 are connected to respective inputs of arithmetic units 122, 124. Circuit 122 performs the steps of first adding the outputs of amplifiers 102 and 104 ($H_1 + H_2$) and multiplying the result of the addition by $\cos 30° = 0.866$. Arithmetic circuit 124 performs the function of subtracting the output of amplifier 104 from the output of amplifier 102 ($H_1 - H_2$) and multiplying the result by $\sin 30° = 0.500$.

The outputs of amplifiers 102 and 104 are each coupled directly to meters 130 and 132, respectively, located on the operator's console for displaying the magnitude of the individual left and right horizontal force components acting on the tow cable.

The output of arithmetic circuit 122 is a signal representing projection AC; the output of arithmetic circuit 124 is a signal representing the projection PC. The output of arithmetic circuit 122 is connected to first inputs of arithmetic circuits 126 and 128, respectively. The output of arithmetic circuit 124 is connected to second inputs of arithmetic circuits 126 and 128, respectively. Arithmetic circuit 126 performs the functions of squaring AC and PC, summing $AC^2$ and $PC^2$, and taking the square root of the quantity $\sqrt{AC^2 + PC^2}$ to produce an output signal representative of resultant vector R which is displayed on an appropriately calibrated meter 134 located at the operator's console.

Arithmetic circuit 128 performs the functions of dividing PC by AC and taking the arc tangent of the result of the division. The output of circuit 128, which represents the magnitude of horizontal tow angle $\alpha$ is displayed at the operator's console on an appropriately calibrated meter 136. The output of circuit 128 is also connected to the input of a comparator 138, similar to comparator 112. Comparator 138 detects a positive or negative tow angle (relative to a zero reference), and generates an output signal on line 140 if the tow angle is positive and on line 142 if the tow angle is negative. Outputs 140 and 142 are connected to display lights 144 and 146, respectively. Display light 144 may be in the form of a green upward pointing arrow to indicate a tow cable angle left of the sled center line; display light 146 may be in the form of a red downward pointing arrow to indicate a tow cable angle to the right of the sled center line.

The output of arithmetic circuit 126 is also coupled to one input of an arithmetic circuit 148. A second input of circuit 148 is connected to the output of summing amplifier 106. Arithmetic circuit 148 is similar to circuit 128 in that it performs the functions of obtaining the arc tangent of the result of dividing $\Sigma V$ by R. The output of arithmetic circuit 148, which represents the magnitude of vertical sled cable angle $\beta$ is displayed on an appropriately calibrated meter 150 located at the operator's console.

The output of arithmetic circuit 148 is also connected to a comparator 152, similar to comparators 138 and 112. Comparator 152 detects a positive or negative sled cable angle (relative to a predetermined zero reference voltage which may represent a desired optimum sled cable angle). A positive sled cable angle generates an output on line 154 which is displayed on the operator's console by means of a light 156, which may be in the form of a green upwardly facing arrow. A negative cable angle appears at an output on line 158 and is displayed on the operator's console by an illuminated bulb 160, which may be in the form of a red downwardly facing arrow.

The output of amplifier 108, representing the magnitude of the detected sled pitch angle, is connected to an appropriately calibrated meter 162 located at the operator's console to display pitch angle $\gamma$. The output of amplifier 108 is also connected to one input of a summing circuit 164, a second input of which is connected to the output of arithmetic circuit 148. Summing circuit 164 performs the function of adding the signals representing sled cable angle $\beta$ and pitch angle $\gamma$ to obtain the net cable vector angle $\lambda$, which is displayed at the operator's console on an appropriate calibrated meter 166.

The output of summing circuit 164 is also connected to the input of a comparator 168, similar in construction to comparators 152, 138 and 112. Comparator 168 detects a positive or negative net cable vector angle (relative to a zero reference); a positive net cable vector angle generates an output signal on line 170 which illuminates a light 172 located on the operator's console. A negative net cable vector angle generates an output signal on line 174 which illuminates a light 176 located on the operator's console. Light 172 may be in the form of a green upwardly facing arrow and light 176 may be in the form of a red downwardly facing arrow.

It is to be noted that all of the electronic components described above are well known and are commercial off-the-shelf items. It should also be noted that the particular electronic circuit described here is exemplary only and other circuits for performing the stated functions could be developed and used. Moreover, pneumatic or hydraulic systems performing these same functions could be employed in place of the described electronic system.

SUMMARY

From the above description, it will be seen that the present invention provides a method and apparatus for continuously detecting and measuring the forces acting on a tow line connected between a surface towing vessel and a subsurface tow, such as a sea sled used for entrenching pipelines on the ocean bottom. With this invention, the continuously measured forces are displayed on the surface towing vessel; thus, the towing barge operator has a continuous picture of the sea sled as it is being towed along the ocean bottom. The information supplied to the operator permits him to "see" at least the following conditions affecting the sled: (1) one side or the other is being skewed due to excessive force on one side or the other (meters 130, 132); (2) whether the sled is pitched up or down (indicators 172, 176) and the magnitude of pitch (meter 166); (3) whether the towing cable is too long or too short (indicators 116, 120 and meter 110); and (4) whether it is off-center with respect to the desired towing direction (indicators 144, 146) and by how much (meter 136).

By having this information continuously available to him, the operator can move the tow barge around, or pay out or take up the tow cable, by an amount just necessary to make the appropriate corrections. Particularly advantageous is the fact that the continuous monitoring system avoids problems of overcompensation found with prior art systems.

The sled vector measuring system of this invention:
1. Determines whether the length of tow line for the weight of chain used is too short or too long. If angle $\gamma$ is upward, the tow line is too short; if angle $\gamma$ is downward, the tow line is too long and may be dragging on the bottom.
2. Determines whether the tow line is pulling the sled straight ahead or to the right or to the left.
3. Determines the magnitude of the corrective action needed to force the sled to move right or left.
4. Determines whether the sled has encountered an obstruction which tends to force the sled off the intended course horizontally or vertically.
5. Determines the effect of the tow line system on the sled to give an evaluation of the sled's ability to perform its function as the tow vessel responds to the ocean environment.

6. Indicates whether the sled is falling into a trench behind a trenching mechanism when used in conjunction with such mechanism, i.e., the sled pitches up at the forward end.
7. Indicates whether the sled encounters softer materials, i.e., if the sled pitches down at the forward end.
8. Determines the optimum required weight of tow chain. If angle λ is negative when optimum R is reached, then the chain is too heavy. Conversely, if angle λ is positive when optimum R is reached, the chain is too light.
9. Determines a condition for overturn of the sled. When Σ V reaches one-half of the sled weight and either $H_1$ or $H_2$ drops to less than one-half of the other, then overturning is imminent as α approaches the extension of the larger of $H_1$ or $H_2$ and becomes approximately 20°. The actual magnitude of α will to some extent depend on sled weight. In the event Σ V is minor and λ is near zero, then the sled has hit an obstruction and overturning is not imminent, but slewing around will be monitored by a change in angle α.
10. Provides optimum safety to the weakest of two systems when two tow systems are connected to the same underwater tow.

The invention may be embodied in other specific forms without departing from the spirit or essential characteristics thereof. The embodiment described above is therefore to be considered in all respects as illustrative and not restrictive, the scope of the invention being indicated by the hereafter appended claims rather than by the foregoing description, and all changes which come within the meaning and range of equivalency of the claims are therefore intended to be embraced therein.

What is claimed is:

1. In a subsurface towing system, wherein a subsurface body is towed by a surface tow vessel, said towed body and surface vessel being connected by cable means, a method of remotely monitoring the attitude of said towed body, comprising;
   measuring first and second substantially relatively orthogonal forces acting on said cable means at the location where said cable means is coupled to said towed body; and
   determining first and second relatively orthogonal deviations of said cable means relative to a reference axis of said towed body from said measured first and second relatively orthogonal forces.

2. A method according to claim 1, wherein said first force R is measured in a relative horizontal plane containing said reference axis.

3. A method according to claim 2, wherein said first deviation comprises an angle α between said reference axis and the direction of said first force is said relative horizontal plane.

4. A method according to claim 3, wherein said second force Σ V is measured in a relative vertical direction perpendicular to said horizontal plane.

5. A method according to claim 4, wherein said second deviation is an angle β in said relative vertical direction whose magnitude is a function of the combined magnitudes of said first and second forces.

6. A method according to claim 5, further comprising:
   measuring a vertical inclination having an angle γ of said reference axis relative to a horizontal reference plane, wherein the total vertical deviation λ of said combined first and second forces relative to said horizontal reference plane is equal to β plus γ.

7. A method according to claim 6, further comprising:
   determining the optimum weight of said cable means as a function of λ and R.

8. A method according to claim 1, further comprising:
   measuring first and second force components $H_1$ and $H_2$, respectively, acting on said cable means in a relative horizontal plane containing said reference axis;
   determining a first deviation angle α of said cable means relative to said reference axis in said relative horizontal plane from said first and second measured force components $H_1$ and $H_2$;
   measuring a force component Σ V in a direction substantially orthogonal to said first and second measured force components; and
   determining a second deviation angle β of said cable means relative to said reference axis in a relative vertical direction from said force component $H_1$, $H_2$ and Σ V.

9. A method according to claim 8, further comprising:
   determining when an imminent overturn condition of said towed body has been reached as a function of Σ V, α, and at least one of $H_1$ and $H_2$.

10. A method according to claim 9, further comprising:
    determining that an imminent overturn condition has been reached when Σ V is not less than one half the weight of said towed body, and one of $H_1$ and $H_2$ is sufficiently less than one half the other of $H_1$ and $H_2$ such that the magnitude of α reaches approximately 20°.

11. A method according to claim 1, wherein said first deviation is determined by:
    measuring first and second force components acting on said cable means;
    determining a first net force component acting between said cable means and said towed body from said first and second measured force components; and
    determining said first deviation of said cable means relative to said reference axis from said first net force component and at least one of said first and second measured force components.

12. A method according to claim 11, wherein said second deviation is determined by:
    measuring third and fourth force components substantially orthogonal to said first and second measured force components;
    determining a second net force component acting between said cable means and said towed body from said third and fourth measured force components; and
    determining said second deviation of said cable means relative to said reference axis from said first and second net force components.

13. A method according to claim 12, wherein:
    said first and second force components are measured along respective legs of a tow line bridle extending from a common junction with said cable means to respective laterally displaced locations on said towed body.

14. A method according to claim 13, wherein said respective legs of said bridle define two legs of a reference triangle.

15. A method according to claim 14, wherein said reference triangle is an isosceles triangle, said bridle legs substantially representing the two equal legs of said isosceles triangle.

16. A method according to claim 14, further comprising:
measuring the inclination of the reference axis of said towed body in said second direction relative to a reference plane; and
determining the net deviation of said cable means relative to said reference plane from said measured inclination and said second deviation.

17. A method according to claim 12, wherein the reference axis of said towed body is its center line and said first deviation is determined as a function of the angle between said center line and said first net force component.

18. A method according to claim 17, wherein said first net force component is determined as a function of the projections AB and BC of said first and second force components, respectively, onto the center line of said towed body and of the projections MC and MP of said first and second force components, respectively, substantially perpendicular to said center line.

19. A method according to claim 18, wherein said first net force component
$$R = \sqrt{(AB + BC)^2 + (MC - MP)^2}.$$

20. A method according to claim 19, wherein said second deviation is determined as a function of the angle between said second net force component and said center line.

21. A method according to claim 20, wherein said second net force component is determined as a function of the sum of said third and fourth force components $V_1$ and $V_2$, respectively.

22. A method according to claim 21, wherein said second deviation is determined as a function of $V_1 + V_2$ and of R.

23. A method according to claim 22, wherein said second deviation $$\beta = \tan^{-1}\left[\frac{(V_1 + V_2)}{R}\right].$$

24. A method according to claim 23, further comprising:
measuring the angle of inclination $\gamma$ of said center line relative to a reference plane; and
determining the net angle $\lambda$ of R in the direction of said second deviation relative to said reference plane from $\beta$ and $\gamma$.

25. A method according to claim 24, wherein said net angle $\lambda = \beta + \gamma$.

26. A method according to claim 21, wherein:
said first and second force components are measured in a relatively horizontal reference plane containing said reference axis of said towed body.

27. A method according to claim 26, wherein:
the reference axis of the towed body is its center line and said first deviation is a function of the angle between the center line and said first net force component in said horizontal reference plane.

28. A method according to claim 26, wherein:
said second deviation is a function of the angle between the center line of said towed body and said first net force component in a direction substantially orthogonal to said horizontal reference plane.

29. A method according to claim 18, wherein said first direction deviation $$\alpha = \tan^{-1}\left[\frac{(MC - MP)}{(AB + BC)}\right].$$

30. In a subsurface towing system, wherein a subsurface body is towed by a surface tow vessel, said towed body and surface vessel being connected by cable means, a method of remotely monitoring the attitude of said towed body, comprising:
measuring first and second force components acting on said cable means;
measuring third and fourth force components substantially orthogonal to said first and second components;
determining a first net force component acting between said cable and said towed body from said first and second force components;
determining a second net force component acting between said cable means and said towed body from said third and fourth force components;
determining a first direction deviation of said cable means relative to a reference axis of said towed body from the first net force component and at least one of said first and second force components; and
determining a second deviation of said cable means in a second direction substantially orthogonal to said first direction from said first and second net force components.

31. A method according to claim 30, wherein:
said first and second force components are respective horizontal components of forces acting on a reference triangle formed by respective legs of a bridle connecting said cable means to said towed body; and
said third and fourth force components are respective vertical components of forces acting on said bridle.

32. The method according to claim 31, further comprising:
measuring the inclination of said towed body reference axis in said second direction relative to a zero angle reference plane; and
determining the deviation of said cable in said second direction relative to said zero angle reference plane from said measured inclination and said determined second deviation of said cable.

33. In an undersea towing system, wherein a body is towed along the sea bottom by a surface tow vessel connected to the towed body by a tow cable through a tow cable bridle, a method of remotely monitoring the attitude of said towed body, comprising:
measuring a first relatively horizontal force component along one leg of an isosceles triangle formed by the tow cable bridle;
measuring a second relatively horizontal force component along a second leg of said isosceles triangle;
measuring a first relatively vertical force component at the base of said one leg of said isosceles triangle;
measuring a second relatively vertical force component at the base of said second leg of said isosceles triangle;

said first location for measuring a first relatively vertical force component between said tow line bridle and said towed body; and said second detecting means further comprises a second vertical transducer mounted on said towed body at said second location for measuring a second relatively vertical force component between said tow line bridle and said towed body;

said apparatus further comprising:

means coupled to said first and second vertical transducers for summing the outputs of said vertical transducers to provide an indication of the magnitude of the net vertical force between said tow line bridle and said towed body.

45. Apparatus according to claim 44, further comprising:

means coupled to said summing means and said means for determining the net relative horizontal force component between said tow line and said towed body for determining the magnitude of the deviation of said net relatively horizontal force component from said reference axis in said second direction.

46. Apparatus according to claim 45, further comprising:

third detecting means mounted on said towed body for detecting the deviation of said towed body in said second direction relative to a horizontal reference plane.

47. Apparatus according to claim 46, wherein said third detecting means comprises a pitch angle detector means whose plane is parallel to the bisector of the isosceles triangle formed by said tow line bridle and whose zero index identifies the normal position of said towed body when resting on said horizontal reference plane.

48. Apparatus according to claim 47, wherein said first and second vertical transducers are mounted to be substantially perpendicular to said horizontal reference plane and substantially parallel to the direction of the zero index of said pitch angle detector.

49. Apparatus for measuring forces acting on a tow line, comprising:

a towed body;

a tow line bridle, including a first length of tow line having one end coupled to said towed body at a first location and a second length of tow line having one end coupled to said towed body at a second location, the second ends of said first and second tow line lengths being coupled together, whereby said first and second tow line lengths form two legs of a reference triangle;

a tow line connected to and extending from the junction of said first and second tow line lengths;

first detecting means at said first location for detecting first relatively orthogonal force components acting on said tow line;

second detecting means at said second location for detecting second relatively orthogonal force components acting on said tow line;

first measuring means coupled to said first and second detecting means for measuring the deviation of said tow line in a first direction relative to a central longitudinal axis of said towed body; and second measuring means coupled to said first and second detecting means for measuring the deviation of said tow line in a direction substantially orthogonal to said first direction.

50. Apparatus according to claim 49, wherein:

said first detecting means comprises a first horizontal transducer mounted on said towed body at said first location for measuring a first relatively horizontal force component $H_1$ between said tow line bridle and said towed body; and said second detecting means comprises a second horizontal transducer mounted on said towed body at said second location for measuring a second relatively horizontal force component $H_2$ between said tow line bridle and said towed body;

said apparatus further comprising:

means coupled to said first and second horizontal transducers for determining the magnitude of the net relative horizontal force component R between said tow line and said towed body.

51. Apparatus according to claim 50, wherein:

said means for determining the magnitude of the net relative horizontal force component R comprises means for determining $$R = \sqrt{(H_1 \cos \theta_1 + H_2 \cos \theta_2)^2 + (H_1 \sin \theta_1 + H_2 \sin \theta_2)^2}$$

where:

$\theta_1$ is the relative horizontal angle between $H_1$ and the center line of the towed body; and $\theta_2$ is the relative horizontal angle between $H_2$ and the center line of the towed body.

52. Apparatus according to claim 51, further comprising:

further means coupled to said first and second horizontal transducers for determining the magnitude of the deviation $\alpha$ of said tow line in said first direction.

53. Apparatus according to claim 52, wherein said further means for determining the magnitude of the deviation $\alpha$ comprises means for determining $$\alpha = \tan^{-1}\left[\frac{(H_1 \cos \theta_1 + H_2 \cos \theta_2)}{(H_1 \sin \theta_1 - H_2 \sin \theta_2)}\right].$$

54. Apparatus according to claim 53, wherein:

said first detecting means further comprises a first vertical transducer mounted on said towed body at said first location for measuring a first relatively vertical force component $V_1$ between said tow line bridle and said towed body; and said second detecting means further comprises a second vertical transducer mounted on said towed body at said second location for measuring a second relatively vertical force component $V_2$ between said tow line bridle and said towed body;

said apparatus further comprising:

means coupled to said first and second vertical transducers for summing the outputs of said vertical transducers to provide an indication of the magnitude $\Sigma V = V_1 + V_2$ of the net vertical force between said tow line bridle and said towed body.

55. Apparatus according to claim 54, further comprising:

means coupled to said summing means and said means for determining the net relative horizontal force component between said tow line and said towed body for determining the magnitude of the deviation $\beta$ of said net relative horizontal force compodetermining the net relative vertical force acting on said tow cable from said first and second vertical force components;

determining the resultant relative horizontal force acting on said cable from the measured first and second horizontal force components;

determining the relative horizontal deviation of said cable relative to the longitudinal axis of said towed body from the determined resultant horizontal force and at least one of said first and second measured horizontal forces; and determining the relative vertical deviation of said cable relative to a horizontal reference plane containing the horizontal axis of said towed body from the determined net vertical force and resultant horizontal force.

34. In a subsurface towing system, wherein a subsurface body is towed by a surface vessel, apparatus for monitoring the attitude of said towed body, comprising:

tow cable means coupled between said surface vessel and said towed body;

means for measuring first and second relatively orthogonal force components acting on said cable means where said cable means is coupled to said towed body; and means for determining first and second relatively orthogonal deviations of said cable means relative to said reference axis from said measured first and second relativley orthogonal force components.

35. Apparatus according to claim 34, wherein:

said cable means is coupled to said towed body at first and second spaced locations;

said measuring means comprises:

first detecting means at said first location for detecting first relatively orthogonal force components acting on said cable means;

second detecting means at said second location for detecting second relatively orthogonal force components acting on said cable means; and said deviation determining means comprises:

first measuring means coupled to said first and second detecting means for measuring the deviation of said cable means in a first direction relative to said reference axis; and second measuring means coupled to said first and second detecting means for measuring the deviation of said cable means in a second direction substantially orthogonal to said first direction.

36. Apparatus according to claim 35, wherein:

said cable means comprises a bridle having a first length of tow line having one end coupled to said towed body at said first location and a second length of tow line having one end coupled to said towed body at said second location, the second ends of said first and second tow line lengths being coupled together, whereby said first and second tow line lengths form two legs of a reference triangle.

37. Apparatus according to claim 36, wherein said first detecting means comprises:

a first horizontal transducer mounted on said towed body at said first location for measuring a first relatively horizontal force component between said tow line bridle and said towed body; and a first vertical transducer mounted on said towed body at said first location for measuring a first relatively vertical force component between said tow line bridle and said towed body.

38. Apparatus according to claim 37, wherein said second detecting means comprises:

a second horizontal transducer mounted on said towed body at said second location for measuring a second relatively horizontal force component between said tow line bridle and said towed body; and a second vertical transducer mounted on said towed body at said second location for measuring a second relatively vertical force component between said tow line bridle and said towed body.

39. Apparatus according to claim 38:

said first horizontal transducer having one end fixed to said towed body and its axially opposite end connected to said one end of said first tow line length;

said first vertical transducer having one end fixed to said towed body and its axially opposite end connected to said one end of said first tow line length;

said second horizontal transducer having one end fixed to said towed body and its axially opposite end connected to said one end of said second tow line length; and said second vertical transducer having one end fixed to said towed and its axially opposite end connected to said one end of said second tow line length.

40. Apparatus according to claim 37, further comprising:

third detecting means mounted on said towed body for detecting the the deviation of said towed body in said second direction relative to a horizontal reference plane.

41. Apparatus according to claim 40, wherein said third detecting means comprises a pitch angle detector means whose plane is parallel to the bisector of the isosceles triangle formed by said tow line bridel and whose zero index identifies the normal position of said towed body when resting on said horizontal reference plane.

42. Apparatus according to claim 41, wherein said first and second vertical transducers are mounted to be substantially perpendicular to said horizontal reference plane and substantially parallel to the direction of the zero index of said pitch angle detector.

43. Apparatus according to claim 36, wherein:

said first detecting means comprises a first horizontal transducer mounted on said towed body at said first location for measuring a first relatively horizontal force component between said tow line bridle and said towed body;

said second detecting means comprises a second horizontal transducer mounted on said towed body at said second location for measuring a second relatively horizontal force component between said tow line bridle and said towed body;

said apparatus further comprising:

means coupled to said first and second horizontal transducers for determining the magnitude of the net relative horizontal force component between said tow line and said towed body; and further means coupled to said first and second horizontal transducers for determining the magnitude of the deviation of said tow line in said first direction.

44. Apparatus according to claim 43, wherein:

said first detecting means further comprises a first vertical transducer mounted on said towed body at nent from said longitudinal axis in said second direction.

56. Apparatus according to claim 55, wherein said means for determining the magnitude of the deviation $\beta$ comprises means for determining $$\beta = \tan^{-1}\frac{\Sigma V}{R}.$$

57. Apparatus according to claim 56, further comprising:
third detecting means mounted on said towed body for detecting the deviation $\gamma$ of said towed body in said second direction relative to a horizontal reference plane.

58. Apparatus according to claim 57, wherein said third detecting means comprises a pitch angle detector means whose plane is parallel to the bisector of the triangle formed by said tow line bridle and whose zero index identifies the normal position of said towed body when resting on said horizontal reference plane.

59. Apparatus according to claim 58, wherein said first and second vertical transducers are mounted to be substantially perpendicular to said horizontal surface and substantially parallel to the direction of the zero index of said pitch angle detector.

60. Apparatus according to claim 59, further comprising:
means for measuring the net vertical angle $\lambda$ of R in the direction of said second deviation relative to said horizontal refernce plane, including means coupled to said third detecting means and to said means for determining the magnitude of the deviation of said net relative horizontal force component in said second direction for summing $\beta$ and $\gamma$.

61. In a subsurface towing system, wherein a subsurface body is towed by a surface tow vessel, said towed body and surface vessel being connected by cable means, a method of remotely monitoring the attitude of said towed body, comprising:
measuring first and second non-colinear forces acting between said cable means and said towed body at the location where said cable means is coupled to said towed body; and
determining the deviation of said cable means relative to reference axis of said towed body from said measured first and second forces.

62. A method according to claim 61, further comprising:
determining first and second non-colinear deviations of said cable means relative to a reference axis of said towed body from said measured first and second forces.

63. A method according to claim 62, wherein said first deviation is determined by:
measuring first and second force components acting on said cable means;
determining a first net force component acting between said cable means and said towed body from said first and second measured force components; and
determining said first deviation of said cable means relative to said reference axis from said first net force component and at least one of said first and second measured force components.

64. A method according to claim 63, wherein said second deviation is determined by:
measuring third and fourth force components which are non-colinear with said first and second measured force components;
determining a second net force component acting between said cable means and said towed body from said third and fourth measured force components, respectively; and
determining said second deviation of said cable means relative to said reference axis from said first and second net force components.

65. In a subsurface towing system, wherein a subsurface body is towed by a surface vessel, apparatus for monitoring the attitude of said towed body, comprising:
tow cable means coupled between said surface vessel and said towed body;
means for measuring first and second non-colinear forces acting between said cable means and said towed body where said cable means is coupled to said towed body; and
means coupled to said measuring means for determining deviations of said cable means relative to a reference axis of said towed body from said measured first and second forces.

66. Apparatus according to claim 65, wherein:
said measuring means comprises means for measuring first and second non-colinear force components acting between said cable means and said towed body where said cable means is coupled to said towed body; and
said determing means comprises means for determining first and second non-colinear deviations of said cable means relative to said reference axis from said measured first and second force components.

* * * * *